US012725630B2

(12) United States Patent
Li et al.

(10) Patent No.: US 12,725,630 B2
(45) Date of Patent: Sep. 1, 2026

(54) METHOD, SYSTEM AND COMPUTER-READABLE STORAGE MEDIUM FOR CROSS-TASK UNSEEN EMOTION CLASS RECOGNITION

(71) Applicant: NATIONAL TSING HUA UNIVERSITY, Hsinchu City (TW)

(72) Inventors: Jeng-Lin Li, Hsinchu City (TW); Chi-Chun Lee, Hsinchu City (TW)

(73) Assignee: NATIONAL TSING HUA UNIVERSITY, Hsinchu City (TW)

( * ) Notice: Subject to any disclaimer, the term of this patent is extended or adjusted under 35 U.S.C. 154(b) by 265 days.

(21) Appl. No.: 18/242,859

(22) Filed: Sep. 6, 2023

(65) Prior Publication Data

US 2024/0395280 A1 Nov. 28, 2024

(30) Foreign Application Priority Data

May 25, 2023 (TW) ................................ 112119474

(51) Int. Cl.

*G10L 25/63* (2013.01)
*G10L 15/02* (2006.01)
*G10L 15/06* (2013.01)
*G10L 15/10* (2006.01)

(52) U.S. Cl.

CPC .............. *G10L 25/63* (2013.01); *G10L 15/02* (2013.01); *G10L 15/063* (2013.01); *G10L 15/10* (2013.01)

(58) Field of Classification Search

CPC ....... G10L 25/63; G10L 15/02; G10L 15/063; G10L 15/10; G10L 25/30

USPC .......................................................... 704/243

See application file for complete search history.

(56) References Cited

U.S. PATENT DOCUMENTS 10,276,189 B1 * 4/2019 Brochu .................. G11B 27/00
10,293,260 B1 * 5/2019 Evans ................... A63F 13/424
10,300,394 B1 * 5/2019 Evans ..................... A63F 13/86
10,846,601 B1 * 11/2020 Howard .................... G06F 8/33
10,891,629 B1 * 1/2021 Barakat ............... H04M 3/5233
11,064,072 B1 * 7/2021 Sawala ............... H04M 3/2281
11,201,966 B1 * 12/2021 Restorff .................. G06F 40/35
11,461,952 B1 * 10/2022 Bosnak ................ G06V 40/176

(Continued)

FOREIGN PATENT DOCUMENTS

CN 106782615 A 5/2017
CN 108780653 A 11/2018

(Continued)

*Primary Examiner* — Thuykhanh Le

(74) *Attorney, Agent, or Firm* — Birch, Stewart, Kolasch & Birch, LLP

(57) ABSTRACT

A method for unseen emotion class recognition comprises: receiving, with an emotion recognition model, a speech sample to be tested; calculating, with an encoder, a sample embedding to be tested of the speech sample to be tested; calculating a first distance metric between the sample embedding to be tested and a first registered emotion category representation, and a second distance metric between the sample embedding to be tested and a second registered emotion category representation, wherein the second registered emotion category is not included in a plurality of basic emotion categories; and determining an emotion category of the speech sample to be tested according to the first distance metric and the second distance metric.

18 Claims, 8 Drawing Sheets

(56) References Cited

U.S. PATENT DOCUMENTS 11,704,501 B2 * 7/2023 Wu ..................... G06N 3/0475 382/156
11,842,729 B1 * 12/2023 Richter ................ G10H 1/0008
12,205,614 B1 * 1/2025 Sharma .................. G10L 25/30
2006/0281064 A1 * 12/2006 Sato .................... G09B 23/286 434/308
2007/0208569 A1 * 9/2007 Subramanian ...... G10L 19/0018 704/E19.007
2008/0040110 A1 * 2/2008 Pereg ..................... G10L 17/26 704/E15.014
2009/0234888 A1 * 9/2009 Holmes ................. G06F 16/639
2012/0105610 A1 * 5/2012 Ahn .................... H04N 13/398 348/54
2016/0171100 A1 * 6/2016 Fujita ...................... G10L 15/10 707/722
2017/0257285 A1 * 9/2017 Scholz ................ H04L 41/5032
2018/0032612 A1 * 2/2018 Kariman ............... G06F 16/433
2019/0253558 A1 * 8/2019 Haukioja ................ G10L 15/22
2019/0294868 A1 * 9/2019 Martinez .............. G06V 40/169
2020/0036810 A1 * 1/2020 Howard .............. G06F 16/9535
2020/0210475 A1 * 7/2020 Aguirre-Suarez .... G06F 16/685
2020/0250278 A1 * 8/2020 Liu ........................ G06F 40/30
2020/0257975 A1 * 8/2020 Chang ...................... G06N 3/08
2020/0394213 A1 * 12/2020 Li ........................ G06F 16/906
2021/0258424 A1 * 8/2021 Brown ................ H04M 3/5175
2021/0319780 A1 * 10/2021 Aher .................. G10L 13/0335
2021/0398562 A1 * 12/2021 Verbeke ................. B60K 35/22
2022/0022790 A1 * 1/2022 Kim ...................... A61B 5/112
2022/0032919 A1 * 2/2022 Lee ...................... B60W 40/02
2022/0076693 A1 3/2022 Bui et al.
2022/0086393 A1 * 3/2022 Peters ................... H04N 7/147
2022/0101873 A1 * 3/2022 Burmistrov ............. G06F 3/167
2022/0132218 A1 * 4/2022 Aher .................. H04N 21/4667
2022/0172711 A1 * 6/2022 Hvelplund .......... G10L 15/1815
2022/0187847 A1 6/2022 Cella et al.
2022/0208180 A1 * 6/2022 Eyben ..................... G10L 25/00
2022/0230623 A1 * 7/2022 Byun .................... G10L 13/033
2022/0292261 A1 9/2022 Movshovitz-Attias et al.
2022/0358935 A1 * 11/2022 Hvelplund ....... G06Q 10/06398
2022/0366197 A1 * 11/2022 Mazza .................. G06F 18/217
2023/0004738 A1 * 1/2023 Wu ...................... G06V 40/176
2023/0007359 A1 * 1/2023 Aher .................. H04N 21/4884
2023/0114150 A1 * 4/2023 Lillelund ................ G06F 40/35 704/251
2023/0289672 A1 * 9/2023 Stumpf .............. G06Q 10/0631
2023/0382407 A1 * 11/2023 Donderici .............. G06N 3/045
2023/0385441 A1 * 11/2023 Donderici ........... B60W 60/001
2023/0386138 A1 * 11/2023 Donderici ........... B60W 60/001
2023/0393553 A1 * 12/2023 Donderici ............ B29C 64/386
2023/0415751 A1 * 12/2023 Donderici ............. B60W 40/08
2023/0419950 A1 * 12/2023 Khare ..................... G10L 15/01
2024/0010224 A1 * 1/2024 Johanna ................. B60K 35/21
2024/0011788 A1 * 1/2024 Valle .................. G01C 21/3694
2024/0015248 A1 * 1/2024 Johanna ............... G06V 20/597
2024/0019864 A1 * 1/2024 Elshenawy ........... B64C 39/024
2024/0025451 A1 * 1/2024 Grace ...................... B60D 1/56
2024/0034280 A1 * 2/2024 Herse ...................... B60S 1/487
2024/0037612 A1 * 2/2024 Rizk ...................... G06V 20/56
2024/0042953 A1 * 2/2024 Chen ........................ H02B 1/56
2024/0078374 A1 * 3/2024 Gokhale ................. G06F 40/30
2024/0126981 A1 * 4/2024 Shahinian ............... G06F 40/40
2024/0246571 A1 * 7/2024 Koduvayur ..... B60W 60/00182
2024/0253664 A1 * 8/2024 Zhang ................ G01C 21/3438
2024/0296044 A1 * 9/2024 Day ........................ G06F 40/30
2024/0317259 A1 * 9/2024 Johanna ............ B60W 60/0013
2024/0326848 A1 * 10/2024 Wachsman ............. B60K 35/21
2024/0347037 A1 * 10/2024 Lee ....................... G10L 13/047
2024/0359705 A1 * 10/2024 Zhang ................ G01C 21/3804
2024/0391487 A1 * 11/2024 Zheng .................... G06N 20/00
2024/0394614 A1 * 11/2024 McKnew ............... G06Q 50/40
2024/0420504 A1 * 12/2024 Mendlovic ........... G06N 3/0464

FOREIGN PATENT DOCUMENTS

CN 113535957 A 10/2021
CN 113706541 A 11/2021
CN 114298019 A 4/2022
CN 114416991 A 4/2022
CN 114420169 A 4/2022
TW 324097 B 1/1998
TW 200506657 A 2/2005
WO WO 2017/075279 A1 5/2017

* cited by examiner

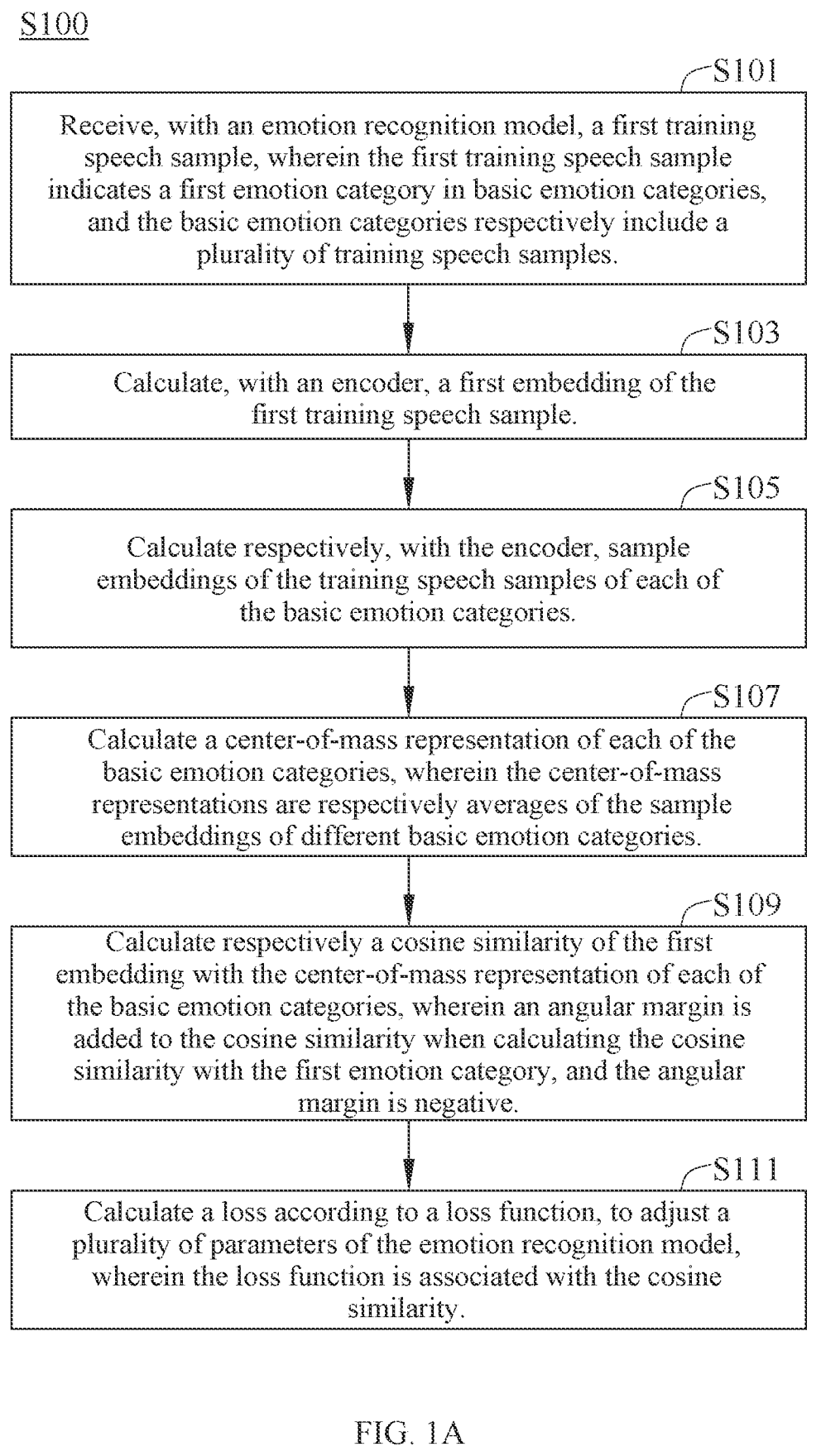

S100

S101: Receive, with an emotion recognition model, a first training speech sample, wherein the first training speech sample indicates a first emotion category in basic emotion categories, and the basic emotion categories respectively include a plurality of training speech samples.

S103: Calculate, with an encoder, a first embedding of the first training speech sample.

S105: Calculate respectively, with the encoder, sample embeddings of the training speech samples of each of the basic emotion categories.

S107: Calculate a center-of-mass representation of each of the basic emotion categories, wherein the center-of-mass representations are respectively averages of the sample embeddings of different basic emotion categories.

S109: Calculate respectively a cosine similarity of the first embedding with the center-of-mass representation of each of the basic emotion categories, wherein an angular margin is added to the cosine similarity when calculating the cosine similarity with the first emotion category, and the angular margin is negative.

S111: Calculate a loss according to a loss function, to adjust a plurality of parameters of the emotion recognition model, wherein the loss function is associated with the cosine similarity.

FIG. 1A

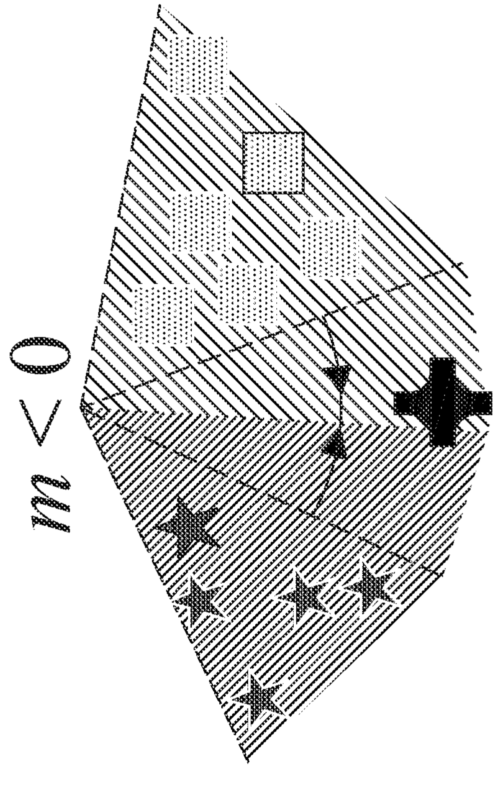
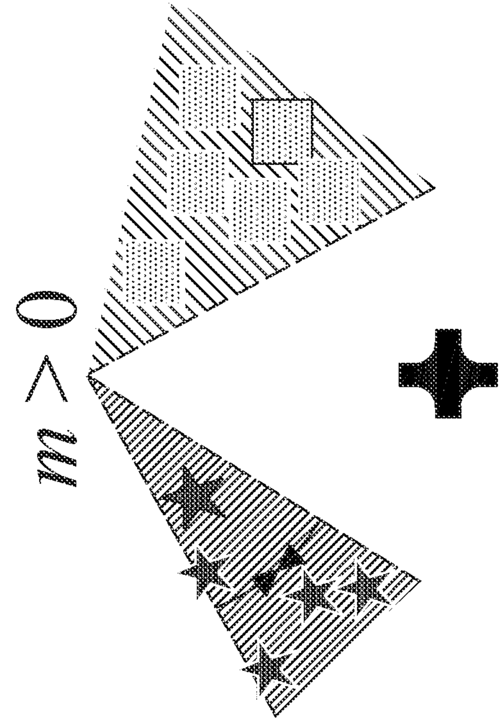
FIG. 2

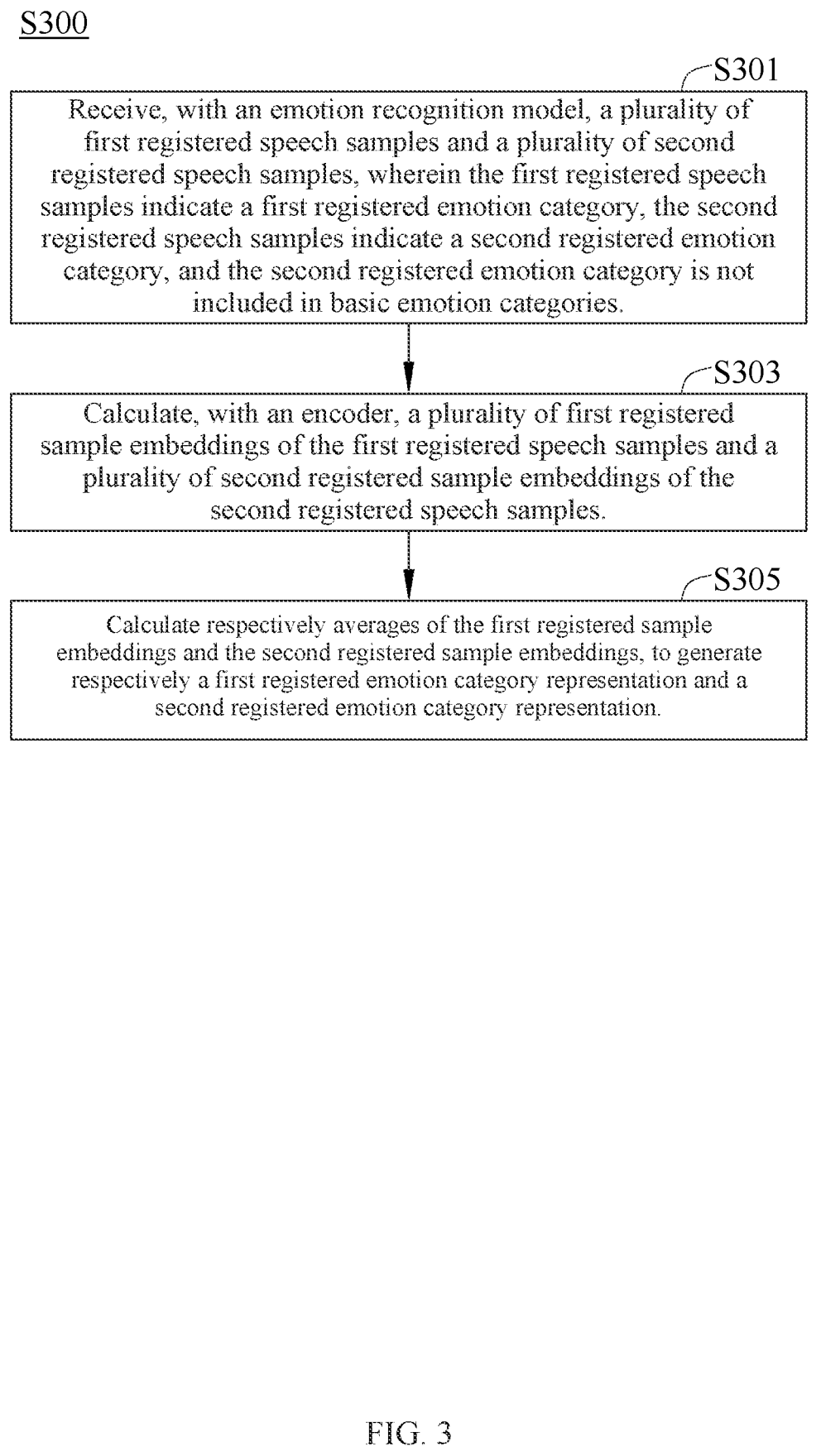

S300

S301: Receive, with an emotion recognition model, a plurality of first registered speech samples and a plurality of second registered speech samples, wherein the first registered speech samples indicate a first registered emotion category, the second registered speech samples indicate a second registered emotion category, and the second registered emotion category is not included in basic emotion categories.

S303: Calculate, with an encoder, a plurality of first registered sample embeddings of the first registered speech samples and a plurality of second registered sample embeddings of the second registered speech samples.

S305: Calculate respectively averages of the first registered sample embeddings and the second registered sample embeddings, to generate respectively a first registered emotion category representation and a second registered emotion category representation.

FIG. 3

METHOD, SYSTEM AND COMPUTER-READABLE STORAGE MEDIUM FOR CROSS-TASK UNSEEN EMOTION CLASS RECOGNITION

TECHNICAL FIELD

The present invention relates to the technical field of speech emotion recognition. Specifically, the present invention relates to a method, system and computer-readable storage medium for cross-task unseen emotion class recognition.

BACKGROUND

As artificial intelligence evolves, accomplishing various kinds of recognition (e.g., face recognition, license plate recognition, object recognition, etc.) with artificial intelligence has become a field that is highly valued by the scientific and industrial circles. Human emotion recognition is also an important development of artificial intelligence. Current emotion recognition models can perform processing using image data (e.g., facial expression recognition, etc.), text data (e.g., converting speech into text to judge the meaning of words) and voice data.

Existing speech emotion recognition models mainly contain "cross-emotion-marker" and "cross-database", the former mainly strengthen the recognition ability adopting "association between emotion categories in intrinsic emotion tasks" or "association between markers", while the latter mainly adopting the source database to develop the pre-training model and training the new model for the target database with the transfer learning method. However, neither of the above two techniques is suitable for scenarios where the emotional task is changed or the emotional category has not appeared before. In the past, in order to be able to identify unclassified emotional categories in the database, many databases would mark emotion categories with dimensions of activation and valence, but these two dimensions are unable to completely express various emotion categories, and when encountering more complex emotions (such as annoyance), there may be gaps in judgment results due to different scenarios.

Therefore, there is a need for a speech emotion recognition method that can perform cross-task emotion recognition for emotions that have never appeared in the database without retraining the model.

SUMMARY

One objective of the present invention is to provide a method, system and computer-readable storage medium for cross-task unseen emotion class recognition, which performs speech emotion recognition without collecting images and converting speech into text.

Another objective of the present invention is to provide a method, system and computer-readable storage medium for cross-task unseen emotion class recognition, which can quickly perform new emotion recognition tasks using only a small amount of emotion sample data and without retraining the model when encountering unclassified emotion categories.

In one implementation, a method for unseen emotion class recognition comprises: receiving, with an emotion recognition model, a speech sample to be tested; calculating, with an encoder, a sample embedding to be tested of the speech sample to be tested; calculating a first distance metric between the sample embedding to be tested and a first registered emotion category representation, and a second distance metric between the sample embedding to be tested and a second registered emotion category representation, wherein the second registered emotion category is not included in a plurality of basic emotion categories; and determining an emotion category of the speech sample to be tested according to the first distance metric and the second distance metric.

By this configuration, the distance between the speech sample embedding to be tested and the registered emotion category representation can be calculated with ease, and the registered emotion category closest to the speech sample embedding to be tested be found, further corresponding the speech sample to be tested to the registered emotion category, to accomplish the objective of emotion recognition.

In another implementation, a system for unseen emotion class recognition comprises a memory having stored thereon a plurality of instructions, and a processor coupled to the memory, wherein the processor is configured to, when executing the instructions, perform the method for unseen emotion class recognition of the foresaid embodiment.

In yet another implementation, a computer-readable storage medium for unseen emotion class recognition is loaded with a computer-readable program capable of, after being read by a computer, performing the method for unseen emotion class recognition of the foresaid embodiment.

BRIEF DESCRIPTION OF THE DRAWINGS

FIG. 1A shows a schematic flow chart of a training procedure of an emotion recognition method of an embodiment of the present invention.

FIG. 2 shows a simplified schematic diagram of projecting distance metrics of basic emotion categories on a hypersphere in an emotion recognition method of an embodiment of the present invention.

FIG. 3 shows a schematic flow chart of a register procedure of an emotion recognition method of an embodiment of the present invention.

DETAILED DESCRIPTION

The method, system and computer-readable storage medium for cross-task unseen emotion class recognition of the present invention are illustrated below by describing specific embodiments and accompanying drawings; a person of ordinary skill in the art can understand the technical concepts and effects of the present invention through the present disclosure. However, the contents disclosed below are not intended to limit the scope of the claimed subject matter; a person of ordinary skill in the art can implement the present disclosure in embodiments with different structures, operation sequences, etc., without departing from the principle of the spirit of the present invention.

Figure 1B:
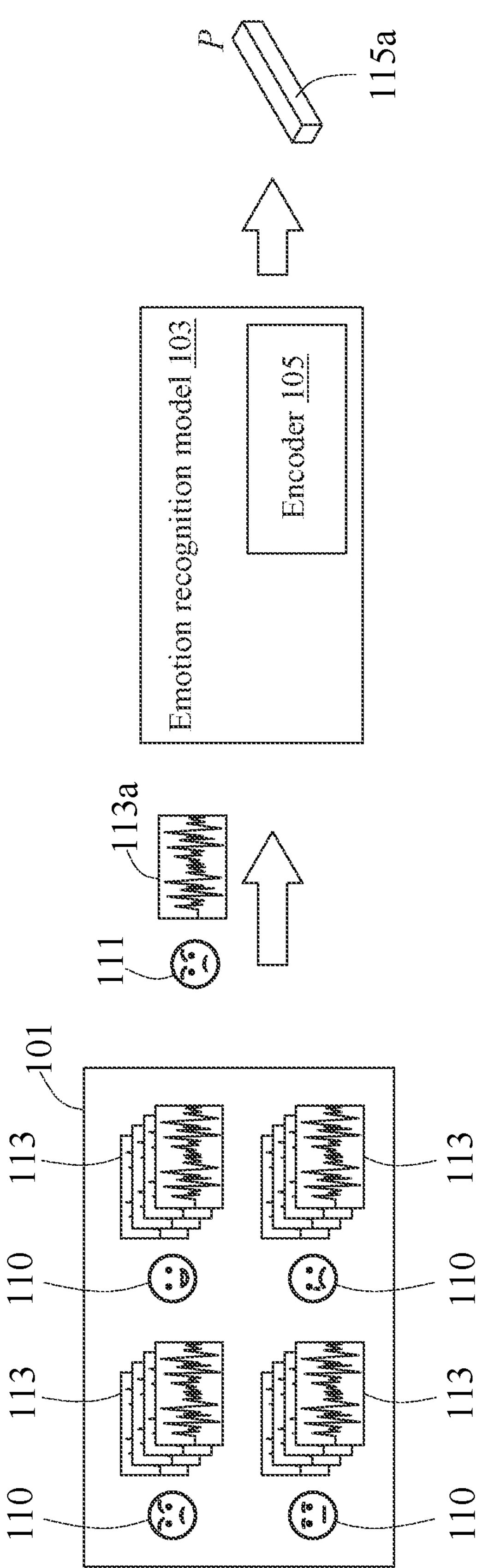
FIG. 1B shows a schematic diagram of a training procedure of an emotion recognition method of an embodiment of the present invention.

In order to clearly illustrate the contents of the present invention, an emotion recognition method is divided in the present embodiment into three phases, i.e., training procedure, register procedure and verification procedure. Refer to FIG. 1A and FIG. 1B illustrating a training procedure S100 of an emotion recognition method of an embodiment of the present invention. At step S101, the procedure includes receiving, with an emotion recognition model 103, a first training speech sample 113*a*, wherein the first training speech sample 113*a* indicates a first emotion category 111 in basic emotion categories 110, and the basic emotion categories 110 include respectively a plurality of training speech samples 113. In the present embodiment, the basic emotion categories 110 can be marked emotion categories in an emotion database 101 (e.g., emotions marked in an IEMOCAP (The Interactive Emotional Dyadic Motion Capture) database, including anger, happiness, neutral and sad, etc.), each of the basic emotion categories 110 having a plurality of training speech samples 113 (i.e., a plurality of speech samples marked as anger, a plurality of speech samples marked as happiness, a plurality of speech samples marked as neutral and a plurality of speech samples marked as sad, etc.). The first emotion category 111 is one emotion in the basic emotion categories 110 (e.g., the first emotion category 111 is anger), and the first training speech sample 113*a* is a speech sample marked as the first emotion category 111 (e.g., a speech sample marked as anger). It should be noted that the foresaid emotion database 101 and basic emotion categories 110 are exemplary illustrations, other emotion databases 101 (e.g., MELD (Multimodal Emotion Lines Dataset) database) can be used and other kinds of basic emotion categories 110 (e.g., disappointment, fear, etc.) be contained and so on in different embodiments, the present invention is not limited hereto.

Refer to FIG. 1A and FIG. 1B going on to illustrate the training procedure S100 of the present embodiment. At step S103, the procedure includes calculating, with an encoder 105, a first embedding 115*a* of the first training speech sample 113*a*. In the present embodiment, the encoder 105 utilizes an acoustic feature generator (e.g., vq-wav2vec model), to fetch an acoustic feature from the first training speech sample 113*a*. Here, the procedure of fetching an acoustic feature can include projecting an original speech waveform of the first training speech sample 113*a* into a latent space to obtain a latent feature, and perform vector quantization to the latent feature (e.g., through the Gumbel-Softmax method) and map to a codebook vector, and so on. Furthermore, the encoder 105 also includes a gated recurrent unit (GRU) model and/or a Transformer model to transform the acoustic feature fetched form the first training speech sample 113*a* into an embedding P, to generate the first embedding 115*a*. It is noteworthy that the GRU model and the Transformer model can be implemented alone or in combination. It should be noted that although a vq-wav2vec model is used in the present embodiment as the acoustic feature generator, but other acoustic feature generators (e.g., convolutional neural network (CNN), hand-crafted features, wav2vec2, Speech2Vec and DeCoAR 2.0) can also be used in different embodiments to fetch the acoustic feature, the above example models can be implemented alone or in combination, the present invention is not limited hereto.

Figure 1C:
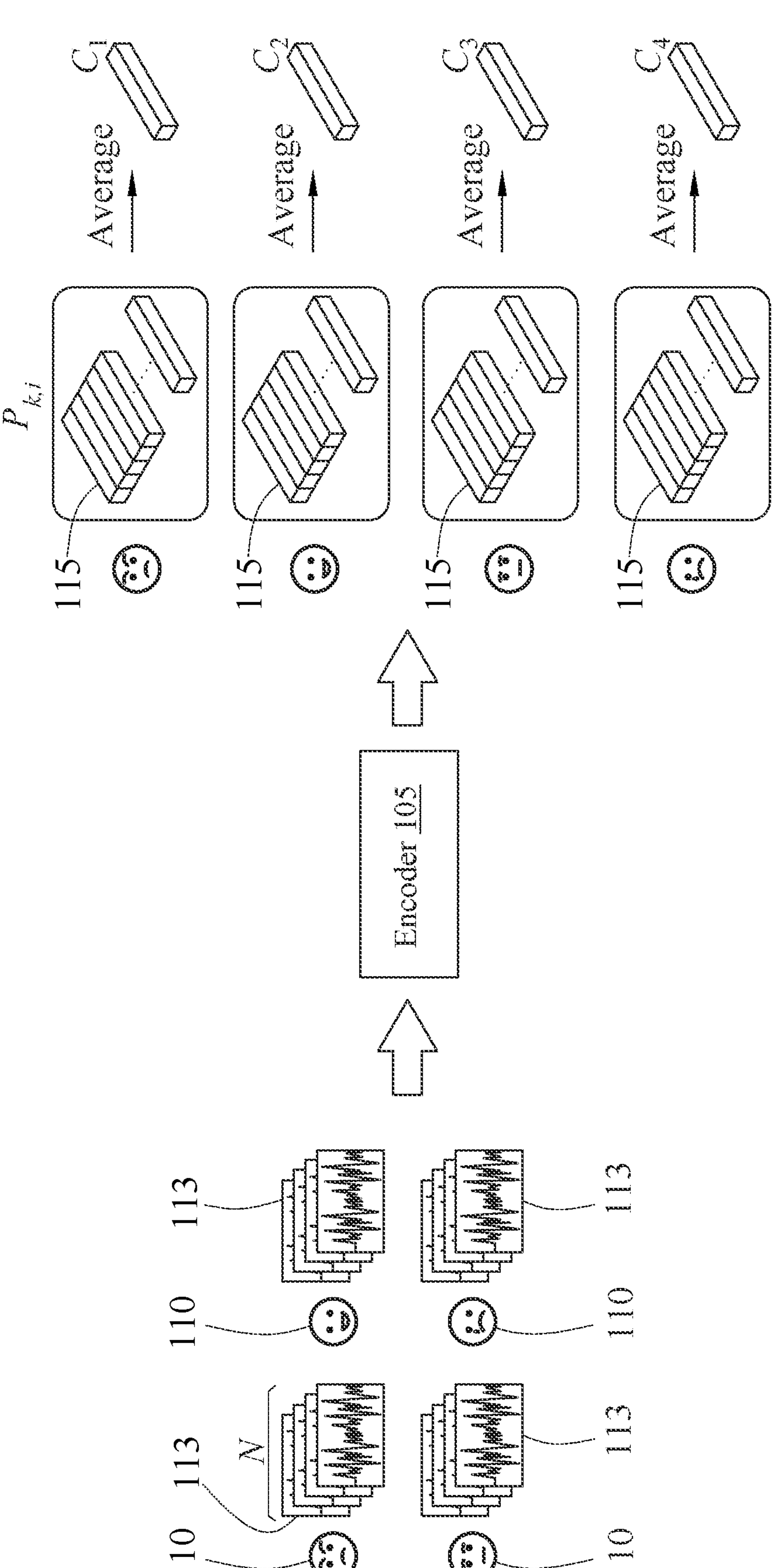
FIG. 1C shows a schematic diagram of a training procedure of an emotion recognition method of an embodiment of the present invention.

Continued with reference to FIG. 1C going on to illustrate, at step S105, the procedure includes calculating respectively, with the encoder 105, sample embeddings 115 of the training speech samples 113 of each of the basic emotion categories 110. As described before, each of the basic emotion categories 110 including the marked plurality of training speech samples 113, the embeddings of the training speech samples 113 can be calculated respectively in this step by the encoder 105 as described before, to generate the plurality of sample embeddings 115. At step S107, the procedure includes calculating a center-of-mass representation $C_k$ of each of the basic emotion categories 110, wherein the center-of-mass representations $C_k$ are respectively averages of the sample embeddings 115 of the different basic emotion categories 110. The calculation formula of the center-of-mass representations $C_k$ is as follows:

$$C_k = \frac{1}{N-1}\Sigma_{i=1}^{N-1} P_{k,i} \tag{1}$$

wherein each of the basic emotion categories 110 has N training speech samples 113, and $C_k$ indicates the center-of-mass representation of the k-th basic emotion category 110 (e.g., $C_1$, $C_2$, $C_3$, $C_4$); $P_{k,i}$ indicates the sample embedding 115 of the i-th training speech sample 113 of the k-th basic emotion category 110.

At step S109, the procedure includes calculating respectively a cosine similarity of the first embedding 115*a* with the center-of-mass representation $C_k$ of each of the basic emotion categories 110, wherein an angular margin is added to the cosine similarity when calculating the cosine similarity with the first emotion category 111, and the angular margin is negative. And at step S111, the procedure includes calculating a loss according to a loss function, to adjust a plurality of parameters of the emotion recognition model 103, wherein the loss function is associated with the cosine similarity. First, refer to the calculation formula of the cosine similarity as follows:

$$S_{j,k} = w \cdot \cos(P_{j,i}, C_k) + b \tag{2}$$

wherein $S_{j,k}$ indicates the cosine similarity of the embedding of the j-th emotion category with the center-of-mass representation of the k-th basic emotion category 110; and the formula of the loss function is as follows:

$$L = L_{ce} - \frac{1}{K}\sum_{j=1}^{K} \log\frac{e^{S_{j,j}}}{\Sigma_{k=1}^{K} e^{S_{j,k}}} \tag{3}$$

wherein L indicates the loss calculated through the loss function, $L_{ce}$ is cross-entropy loss. Since the first emotion category 111 is also included in the basic emotion categories 110, according to the foresaid formulas, calculating the cosine similarity may contain two situations, i.e., the first emotion category 111 is the same as the basic emotion categories 110 and the first emotion category 111 is different from the basic emotion categories 110. To be specific, assuming the first emotion category 111 to be anger, basic emotion categories 110 including anger, happiness, neutral and sad, then $S_{j,j}$ indicates the cosine similarity between the first embedding 115*a* of the first emotion category 111 (anger) and the center-of-mass representation $C_k$ of anger of the basic emotion categories 110, while $S_{j,k}$ also includes the cosine similarity between the first emotion category 111 (anger) and the center-of-mass representation $C_k$ of other basic emotion categories 110 (happiness, neutral and sad). In this way, the loss L can be designed to decrease the distance projected to a hypersphere when the first emotion category 111 and the basic emotion categories 110 are the same, and increase the distance when the first emotion category 111 and the basic emotion categories 110 are not the same.

It should be noted that although the first emotion category 111 is taken to be anger as an exemplary illustration in the present embodiment, but in a process of calculating the loss to adjust parameters of the emotion recognition model 103, first emotion category 111 is not a fixed emotion category, but can be any emotion category in the basic emotion categories 110, and cosine similarities of the first embedding 115*a* of the first emotion category 111 with center-of-mass representations $C_k$ of the basic emotion categories 110 are calculated respectively. For example, the first emotion category 111 is happiness, the first training speech sample 113*a* is a speech sample marked as happiness, after the first embedding 115*a* of the first training speech sample 113*a* is calculated by the encoder 105, cosine similarities between the first embedding 115*a* and center-of-mass representations $C_k$ of the basic emotion categories 110 (anger, happiness, neutral and sad) are calculated respectively; or the first emotion category 111 is neutral or sad and so on, which will not be listed one by one herein for the sake of concisely illustrating the present invention.

Refer to FIG. 2 going on to illustrate, although it is illustrated in the foresaid content that the loss can be designed so that the distance among same categories in the space is decreased while the distance among different categories is increased, but excessive concentration of distributions of same categories and dispersion of those of different categories may result in overly dispersed distributions of unknown emotion categories, in turn reducing the ability to represent unknown emotion categories. Therefore, when the first emotion category 111 is the same as the basic emotion categories 110 in the present invention, the calculation formula of cosine similarities also includes an angular margin, and the angular margin is negative, the formula being as follows:

$$S_{j,k} = \begin{cases} w\cdot(\cos(P_{j,i}, C_k) + m) & j = k \\ w\cdot\cos(P_{j,i}, C_k) & j \neq k \end{cases} \tag{4}$$

wherein m is angular margin, and m<0. By incorporating a negative angular margin m in the formula of cosine similarity, overly dispersed distances between different emotion categories can be balanced, so that boundaries of distributions of same emotion categories may be expanded. Refer to FIG. 2 showing a schematic diagram of emotion category distributions in the space, when the angular margin m is positive (left diagram of FIG. 2), the distribution between emotion categories (star signs and square signs) has a blank area, and when the angular margin m is negative (right diagram of FIG. 2), boundaries of the emotion category distributions are expanded so as to encompass the unknown emotion category (cross sign) that may exist between them. By this configuration, when the emotion recognition model 103 having undergone the training procedure S100 receives speech samples, even if the speech samples contain unknown emotion categories, representation of the unknown emotion categories can also be obtained through the encoder 105, further facilitating the subsequent register procedure S300 (see FIG. 3) and verification procedure S500 (see FIG. 5).

Figure 4:
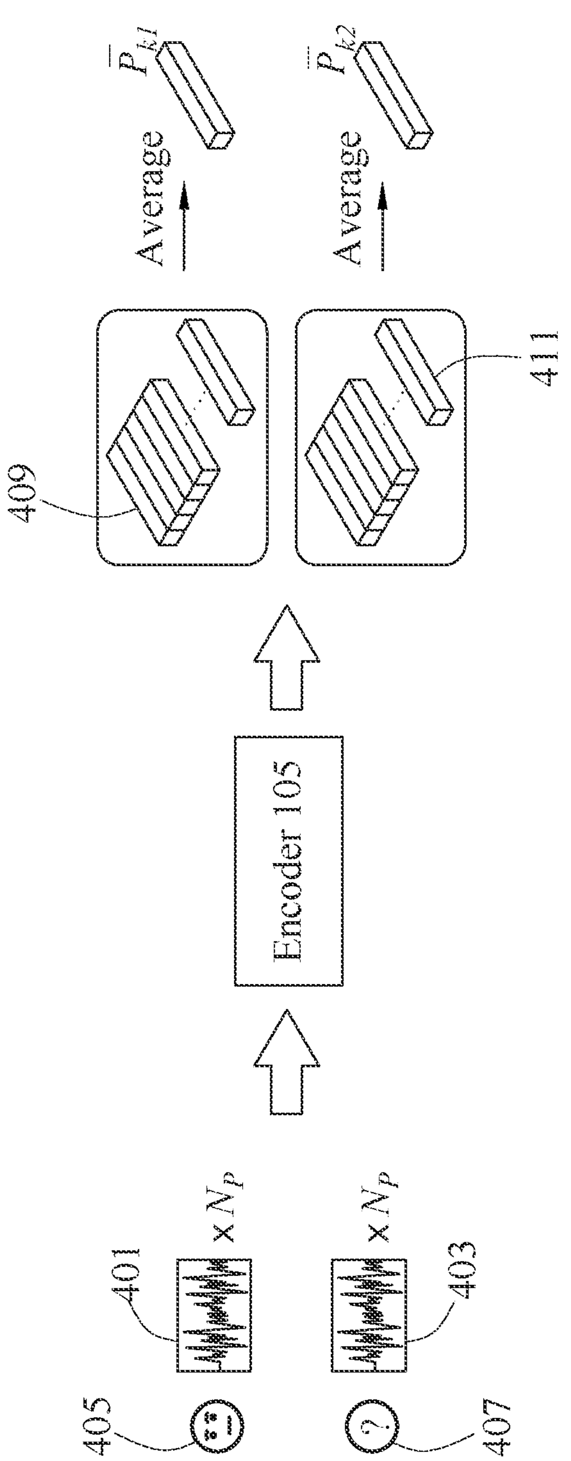
FIG. 4 shows a schematic diagram of a process of registering emotion categories in an emotion recognition method of an embodiment of the present invention.

Refer to FIG. 3 and FIG. 4 illustrating a register procedure S300 of an emotion recognition method of an embodiment of the present invention. At step S301, the procedure includes receiving, with the emotion recognition model 103, a plurality of first registered speech samples 401 and a plurality of second registered speech samples 403, wherein the first registered speech samples 401 indicate a first registered emotion category 405, the second registered speech samples 403 indicate a second registered emotion category 407, and the second registered emotion category 407 is not included in the basic emotion categories 110. In this step, the emotion recognition model 103 can receive speech samples of a marked emotion category, and the emotion category can be a category other than the basic emotion categories 110; in the present embodiment for example, the first registered emotion category 405 can be neutral, the second registered emotion category 407 can be frustration. Furthermore, sample numbers of the first registered speech samples 401 and the second registered speech samples 403 do not need to be as large as that for training the emotion recognition model 103 in the training procedure S100, but only need small numbers of samples.

As above, at step S303, the procedure includes calculating, with the encoder 105, a plurality of first registered sample embeddings 409 of the first registered speech samples 401 and a plurality of second registered sample embeddings 411 of the second registered speech samples 403. As described in the training procedure S100, due to the introduction of a negative angular margin in the formula of cosine similarity, boundaries of the basic emotion categories 110 in the space are expanded, further encompassing possible unknown emotion categories. Therefore, even if the second registered emotion category 407 does not belong to the basic emotion categories 110, the second registered sample embeddings 411 of the second registered speech samples 403 can still be calculated by the encoder 105 of the foresaid trained emotion recognition model 103. At step S305, the procedure includes calculating respectively averages of the first registered sample embeddings 409 and the second registered sample embeddings 411, to generate respectively a first registered emotion category representation $\overline{P}_{k1}$ and a second registered emotion category representation $\overline{P}_{k2}$. Here, the way of calculating the first registered emotion category representation $\overline{P}_{k1}$ and the second registered emotion category representation $\overline{P}_{k2}$ is similar to calculating center-of-mass representations $C_k$, i.e., the summation of the first registered sample embeddings 409 divided by the sample number (e.g., $N_p$) of the first registered speech samples 401, and the summation of the second registered sample embeddings 411 divided by the sample number (e.g., $N_p$) of the second registered speech samples 403. It should be noted that although only the first registered emotion category 405 and the second registered emotion category 407 are exemplified in the present embodiment, but the emotion categories to perform the register procedure S300 can be more than two, like registering all of the basic emotion categories 110 (anger, happiness, neutral) and more than one unknown emotion category, and so on.

Figure 5:
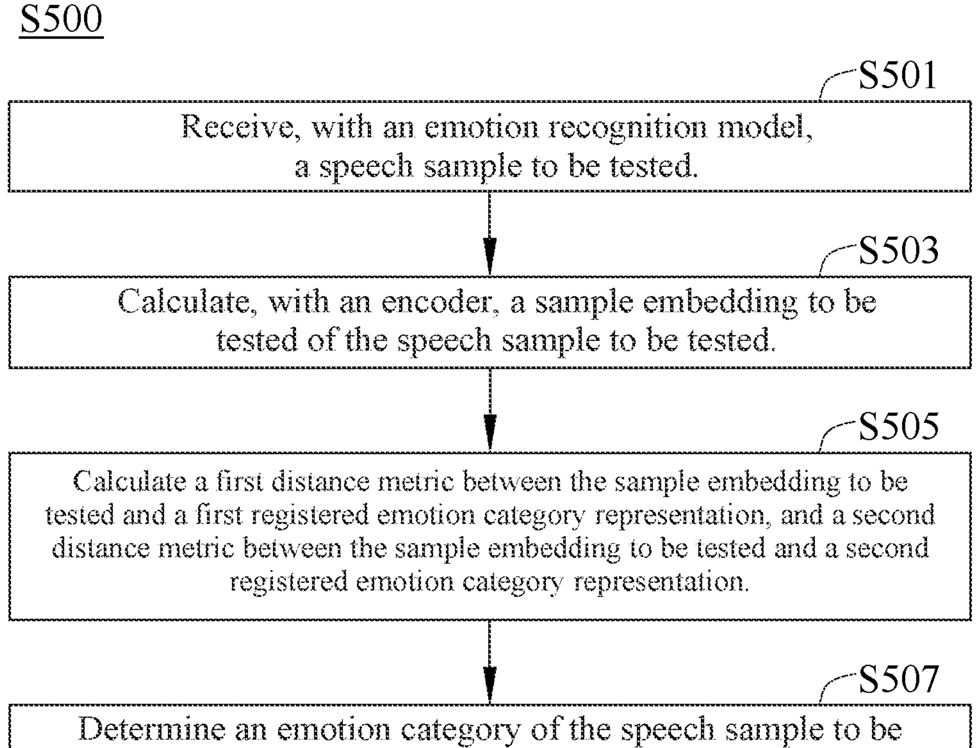
FIG. 5 shows a schematic flow chart of a verification procedure of an emotion recognition method of an embodiment of the present invention.
Figure 6:
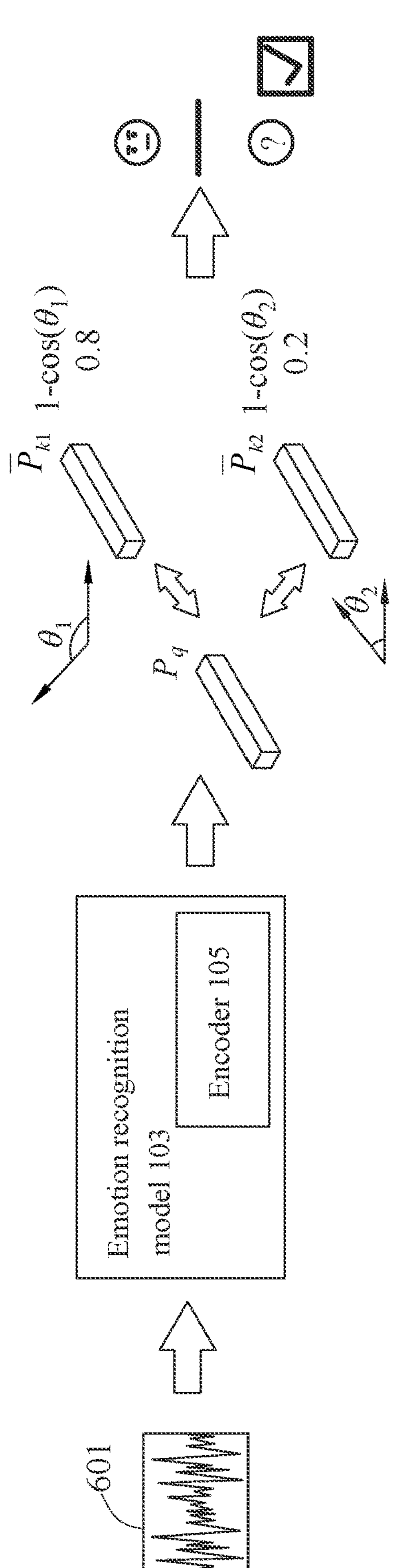
FIG. 6 shows a schematic diagram of a process of recognizing a speech sample to be tested of an embodiment of the present invention.

Refer to FIG. 5 and FIG. 6 illustrating a verification procedure S500 of an emotion recognition method of an embodiment of the present invention. At step S501, the procedure includes receiving, with the emotion recognition model 103, a speech sample to be tested 601. And at step S503, the procedure includes calculating, with the encoder 105, a sample embedding to be tested of the speech sample to be tested 601. Refer to the showing by FIG. 6, the speech sample to be tested 601 being a speech sample of an unmarked emotion category, a sample embedding to be tested $P_q$ of the speech sample to be tested 601 can be calculated by the encoder 105 of the emotion recognition model 103 having undergone the training procedure S100 and the register procedure S300. At step S505, the procedure includes calculating a first distance metric between the sample embedding to be tested $P_q$ and the first registered emotion category representation $\overline{P}_{k1}$, as well as a second distance metric between the sample embedding to be tested $P_q$ and the second registered emotion category representation $\overline{P}_{k2}$. In the present embodiment, the way of calculating distance metrics is to calculate the cosine distance between the two; assuming the included angle between $P_q$ and $\overline{P}_{k1}$ as $\theta_1$, the included angle between $P_q$ and $\overline{P}_{k2}$ as $\theta_2$, then the first distance metric between the sample embedding to be tested $P_q$ and the first registered emotion category representation $\overline{P}_{k1}$ is $1-\cos(\theta_1)$, and the second distance metric between the sample embedding to be tested $P_q$ and the second registered emotion category representation $\overline{P}_{k2}$ is $1-\cos(\theta_2)$. It should be noted that although distance metrics are calculated with the formula of cosine distance in the present embodiment, but in different embodiments, distance metrics can also be calculated using other appropriate distance calculation methods (e.g., Euclidean distance, Manhattan distance, mutual information or Kullback-Leibler divergence, etc.), the present invention is not limited hereto.

Continuing to illustrate the present embodiment as above, at step S507, the procedure includes determining an emotion category of the speech sample to be tested 601 according to the first distance metric and the second distance metric. In the present embodiment, determining the emotion category of the speech sample to be tested 601 includes determining the emotion category as the first registered emotion category 405 according to the first distance metric being smaller than the second distance metric, or determining the emotion category as the second registered emotion category 407 according to the second distance metric being smaller than the first distance metric. For example, assuming the value of the first distance metric $1-\cos(\theta_1)$ to be 0.8, and the value of the second distance metric $1-\cos(\theta_2)$ to be 0.2, since the first distance metric is larger than the second distance metric (i.e., the speech sample to be tested 601 is closer to the second registered emotion category 407), then the emotion category of the speech sample to be tested 601 is predicted to be the second registered emotion category 407. It should be noted that although only the first distance metric and the second distance metric are compared in the present embodiment, but as described in the illustration of the register procedure S300, the present invention can register more than two emotion categories; when registering more than two emotion categories, the sample embedding to be tested of the speech sample to be tested 601 and the distance metric of each registered emotion category representation are calculated respectively, and the one with the smallest distance metric is taken as the prediction of the emotion category of the speech sample to be tested 601.

By introducing a negative angular margin in the formula of calculating cosine similarity in the foresaid training procedure S100, so that boundaries of distributions of the basic emotion categories 110 in the space are expanded, the emotion recognition model 103 is so configured that when facing new emotion recognition tasks, in the case of receiving only a small number of speech samples of the emotion category, the encoder 105 can be used to calculate the embedding of the new emotion category to perform the register procedure S300, without re-collecting a large number of speech samples and retraining the emotion recognition model 103 through the training procedure S100. And by the verification procedure S500, the emotion recognition model 103 can accomplish recognition tasks of new emotion categories through calculating distance metrics with ease, thereby achieving the objective of cross-task unseen emotion class recognition of the present invention.

An emotion recognition system of another embodiment of the present invention includes a memory and a processor, the memory being used for storing the emotion recognition model and a plurality of instructions that, when executed, configure the processor to perform an emotion recognition method of any one of the foresaid embodiments. Here, the processor can include any appropriate hardware device, such as central processing unit (CPU), microcontroller and application-specific integrated circuit (ASIC) and so on, and the memory can be appropriate storage media such as random access memory (RAM), flash memory and so on, the present invention is not limited hereto. Furthermore, a computer-readable storage medium of still another embodiment of the present invention includes a computer-readable program that, after being read by a computer, may perform an emotion recognition method of any one of the embodiments as described before.

The above-mentioned disclosure is only the preferred embodiment of the present invention, is not intended to limit the claims of the present invention, and the orders in the methods described herein are also only exemplary illustrations, a person of ordinary skill in the art can modify the orders of steps under equivalent concepts of the present invention. Furthermore, unless there is a clear contradiction with the contents herein, the singular terms "a" and "the" used herein also include plural cases, and terms such as "first" and "second" are also intended to facilitate a person of ordinary skill in the art to understand the concepts of contents of the present invention, rather than to limit the nature of the elements in the present invention. The shape, position and size of each element, component and unit in the appended drawings are intended to concisely and clearly show the technical contents of the present invention, rather than to limit the present invention. Also, well-known details or constructions may be omitted in the drawings.

REFERENCE NUMERALS

101: emotion database
103: emotion recognition model
105: encoder
110: basic emotion categories
111: first emotion category
113: training speech samples
113*a*: first training speech sample
115: sample embeddings
115*a*: first embedding
401: first registered speech samples
403: second registered speech samples
405: first registered emotion category
407: second registered emotion category
409: first registered sample embeddings
411: second registered sample embeddings
601: speech sample to be tested
S100: training procedure
S101: step
S103: step
S105: step
S107: step
S109: step
S111: step S300: register procedure
S301: step
S303: step
S305: step
S500: verification procedure
S501: step
S503: step
S505: step
S507: step

What is claimed is:

1. A method for unseen emotion class recognition with a speech recognition device, comprising:

receiving, by an emotion recognition model, a speech sample to be tested;

calculating, by an encoder, a sample embedding to be tested of the speech sample to be tested;

calculating a first distance metric between the sample embedding to be tested and a first registered emotion category representation, and a second distance metric between the sample embedding to be tested and a second registered emotion category representation, wherein the second registered emotion category is not included in a plurality of basic emotion categories;

comparing the first distance metric and the second distance metric; and determining an emotion category of the speech sample to be tested based on the comparison result, wherein the method further comprises a training the emotion recognition model by means of:

receiving, by the emotion recognition model, a first training speech sample, wherein the first training speech sample indicates a first emotion category in the basic emotion categories, and the basic emotion categories include respectively a plurality of training speech samples;

calculating, by the encoder, a first embedding of the first training speech sample;

calculating respectively, by the encoder, a plurality of sample embeddings of the training speech samples of each of the basic emotion categories;

calculating a center-of-mass representation of each of the basic emotion categories, wherein the center-of-mass representations are respectively averages of the sample embeddings of different basic emotion categories;

calculating respectively a cosine similarity of the first embedding with the center-of-mass representation of each of the basic emotion categories, wherein an angular margin is added to the cosine similarity when calculating the cosine similarity with the first emotion category, and the angular margin is negative;

calculating a loss according to a loss function; and adjusting a plurality of parameters of the emotion recognition model based on the calculated loss, wherein the loss function is associated with the cosine similarity.

2. The method of claim 1, wherein the encoder comprises an acoustic feature generator to fetch an acoustic feature from the speech sample to be tested.

3. The method of claim 2, wherein the encoder comprises a gated recurrent unit (GRU) model and a Transformer model to transform the acoustic feature into the sample embedding to be tested.

4. The method of claim 1, further comprising a register procedure which comprises:

receiving, with the emotion recognition model, a plurality of first registered speech samples and a plurality of second registered speech samples, wherein the first registered speech samples indicate the first registered emotion category and the second registered speech samples indicate the second registered emotion category;

calculating, with the encoder, a plurality of first registered sample embeddings of the first registered speech samples and a plurality of second registered sample embeddings of the second registered speech samples; and calculating respectively averages of the first registered sample embeddings and the second registered sample embeddings, to generate respectively the first registered emotion category representation and the second registered emotion category representation.

5. The method of claim 1, wherein the loss function includes a cross-entropy loss.

6. The method of claim 1, wherein determining the emotion category of the speech sample to be tested comprises: determining the emotion category as the first registered emotion category according to the first distance metric being smaller than the second distance metric, or determining the emotion category as the second registered emotion category according to the second distance metric being smaller than the first distance metric.

7. A speech recognition device for unseen emotion class recognition, comprising:

a memory having stored thereon a plurality of instructions; and a processor coupled to the memory, wherein the processor is configured to, when executing the instructions:

receive, by an emotion recognition model, a speech sample to be tested;

calculate, by an encoder, a sample embedding to be tested of the speech sample to be tested;

calculate a first distance metric between the sample embedding to be tested and a first registered emotion category representation, and a second distance metric between the sample embedding to be tested and a second registered emotion category representation, wherein the second registered emotion category is not included in a plurality of basic emotion categories;

comparing the first distance metric and the second distance metric; and determine an emotion category of the speech sample to be tested based on the comparison result, wherein the processor is further configured to:

receive, by the emotion recognition model, a first training speech sample, wherein the first training speech sample indicates a first emotion category in the basic emotion categories, and the basic emotion categories include respectively a plurality of training speech samples;

calculate, by the encoder, a first embedding of the first training speech sample;

calculate respectively, by the encoder, a plurality of sample embeddings of the training speech samples of each of the basic emotion categories;

calculate a center-of-mass representation of each of the basic emotion categories, wherein the center-of-mass representations are respectively averages of the sample embeddings of different basic emotion categories;

calculate respectively a cosine similarity of the first embedding with the center-of-mass representation of each of the basic emotion categories, wherein an angular margin is added to the cosine similarity when calculating the cosine similarity with the first emotion category, and the angular margin is negative;

calculate a loss according to a loss function; and adjust a plurality of parameters of the emotion recognition model based on the calculated loss, wherein the loss function is associated with the cosine similarity.

8. The speech recognition device of claim 7, wherein the encoder comprises an acoustic feature generator to fetch an acoustic feature from the speech sample to be tested.

9. The speech recognition device of claim 8, wherein the encoder comprises a gated recurrent unit (GRU) model and a Transformer model to transform the acoustic feature into the sample embedding to be tested.

10. The speech recognition device of claim 7, wherein the processor is further configured to:

receive, with the emotion recognition model, a plurality of first registered speech samples and a plurality of second registered speech samples, wherein the first registered speech samples indicate the first registered emotion category and the second registered speech samples indicate the second registered emotion category;

calculate, with the encoder, a plurality of first registered sample embeddings of the first registered speech samples and a plurality of second registered sample embeddings of the second registered speech samples; and calculate respectively averages of the first registered sample embeddings and the second registered sample embeddings, to generate respectively the first registered emotion category representation and the second registered emotion category representation.

11. The speech recognition device of claim 7, wherein the loss function includes a cross-entropy loss.

12. The speech recognition device of claim 7, wherein the processor is configured to: determine the emotion category of the speech sample to be tested as the first registered emotion category according to the first distance metric being smaller than the second distance metric, or determine the emotion category as the second registered emotion category according to the second distance metric being smaller than the first distance metric.

13. A computer-readable non-transitory storage medium for unseen emotion class recognition loaded with a computer-readable program capable of, after being read by a speech recognition device, configure the speech recognition device to:

receive, by an emotion recognition model, a speech sample to be tested;

calculate, by an encoder, a sample embedding to be tested of the speech sample to be tested;

calculate a first distance metric between the sample embedding to be tested and a first registered emotion category representation, and a second distance metric between the sample embedding to be tested and a second registered emotion category representation, wherein the second registered emotion category is not included in a plurality of basic emotion categories;

comparing the first distance metric and the second distance metric; and determine an emotion category of the speech sample to be tested based on the comparison result;

wherein the computer-readable program is capable of, after being read by the speech recognition device, further configure the speech recognition device to:

receive, by the emotion recognition model, a first training speech sample, wherein the first training speech sample indicates a first emotion category in the basic emotion categories, and the basic emotion categories include respectively a plurality of training speech samples;

calculate, by the encoder, a first embedding of the first training speech sample;

calculate respectively, by the encoder, a plurality of sample embeddings of the training speech samples of each of the basic emotion categories;

calculate a center-of-mass representation of each of the basic emotion categories, wherein the center-of-mass representations are respectively averages of the sample embeddings of different basic emotion categories;

calculate respectively a cosine similarity of the first embedding with the center-of-mass representation of each of the basic emotion categories, wherein an angular margin is added to the cosine similarity when calculating the cosine similarity with the first emotion category, and the angular margin is negative;

calculating a loss according to a loss function; and adjusting a plurality of parameters of the emotion recognition model based on the calculated loss, wherein the loss function is associated with the cosine similarity.

14. The computer-readable non-transitory storage medium of claim 13, wherein the encoder comprises an acoustic feature generator to fetch an acoustic feature from the speech sample to be tested.

15. The computer-readable non-transitory storage medium of claim 14, wherein the encoder comprises a gated recurrent unit (GRU) model and a Transformer model to transform the acoustic feature into the sample embedding to be tested.

16. The computer-readable non-transitory storage medium of claim 13, wherein the computer-readable program is capable of, after being read by the speech recognition device, further configure the speech recognition device to:

receive, with the emotion recognition model, a plurality of first registered speech samples and a plurality of second registered speech samples, wherein the first registered speech samples indicate the first registered emotion category and the second registered speech samples indicate the second registered emotion category;

calculate, with the encoder, a plurality of first registered sample embeddings of the first registered speech samples and a plurality of second registered sample embeddings of the second registered speech samples; and calculate respectively averages of the first registered sample embeddings and the second registered sample embeddings, to generate respectively the first registered emotion category representation and the second registered emotion category representation.

17. The computer-readable non-transitory storage medium of claim 13, wherein the loss function includes a cross-entropy loss.

18. The computer-readable non-transitory storage medium of claim 13, wherein the computer-readable program is capable of, after being read by the speech recognition device, configure the speech recognition device to: determine the emotion category of the speech sample to be tested as the first registered emotion category according to the first distance metric being smaller than the second distance metric, or determine the emotion category as the second registered emotion category according to the second distance metric being smaller than the first distance metric.

* * * * *